US007904825B2

(12) United States Patent
Penke et al.

(10) Patent No.: US 7,904,825 B2

(45) Date of Patent: Mar. 8, 2011

(54) GRAPHICAL USER INTERFACE FOR GATHERING IMAGE EVALUATION INFORMATION

(75) Inventors: Mark S. Penke, West Henrietta, NY (US); Donald A. Brown, Honeoye Falls, NY (US); Sarah E. Campbell, Rochester, NY (US); Cornell Juliano, Churchville, NY (US); David M. Parsons, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 501 days.

(21) Appl. No.: 11/717,856

(22) Filed: Mar. 14, 2007

(65) Prior Publication Data

US 2008/0229221 A1 Sep. 18, 2008

(51) Int. Cl.
*G06F 3/00* (2006.01)

(52) U.S. Cl. ........................................................ 715/772

(58) Field of Classification Search ........................ None
See application file for complete search history.

(56) References Cited

U.S. PATENT DOCUMENTS 5,893,075 A * 4/1999 Plainfield et al. ............... 705/14
6,230,169 B1 * 5/2001 Nagae ........................... 715/203
6,694,355 B1 * 2/2004 Bahar ........................... 709/217
6,937,913 B2 8/2005 Nishikawa et al.
7,016,882 B2 3/2006 Afeyan et al.
7,181,696 B2 * 2/2007 Brock ........................... 715/758
7,559,017 B2 * 7/2009 Datar et al. ................... 715/230
7,581,175 B1 * 8/2009 Skwirblies .................... 715/239
2002/0049780 A1 * 4/2002 Ellison ....................... 707/500.1
2004/0230676 A1 * 11/2004 Spivack et al. ................ 709/223
2005/0071865 A1 * 3/2005 Martins ........................... 725/10
2005/0177783 A1 * 8/2005 Agrawala et al. ............. 715/512
2005/0251462 A1 * 11/2005 Nykamp ......................... 705/27
2005/0261953 A1 * 11/2005 Malek et al. .................... 705/10
2006/0112334 A1 * 5/2006 Endrikhovski et al. ....... 715/700
2006/0116930 A1 6/2006 Goldstein
2006/0116983 A1 * 6/2006 Dettinger et al. ................. 707/3
2006/0242178 A1 * 10/2006 Butterfield et al. ........... 707/100
2006/0257839 A1 * 11/2006 Miyaji et al. .................. 434/323
2007/0016689 A1 * 1/2007 Birch ............................ 709/241
2007/0220042 A1 * 9/2007 Mueller et al. ................ 707/102
2007/0277121 A1 * 11/2007 Beckman ...................... 715/847
2007/0288246 A1 * 12/2007 Ebert ............................... 705/1
2008/0005655 A1 * 1/2008 Sankaran et al. .......... 715/500.1
2008/0010585 A1 * 1/2008 Schneider et al. ............ 715/201
2008/0052156 A1 * 2/2008 Brenner .......................... 705/14
2008/0136838 A1 * 6/2008 Goede et al. .................. 345/619
2008/0270915 A1 * 10/2008 Tevanian et al. .............. 715/751
2009/0254828 A1 * 10/2009 Denoue et al. ................ 715/723
2009/0287678 A1 * 11/2009 Brown et al. ...................... 707/5
2009/0325142 A1 * 12/2009 Beavers et al. ............... 434/365
2010/0058181 A1 * 3/2010 Ganesan et al. .............. 715/700
2010/0146404 A1 * 6/2010 Nykamp ....................... 715/755

* cited by examiner

*Primary Examiner* — Ryan F Pitaro
(74) *Attorney, Agent, or Firm* — MH2 Technology Law Group LLP

(57) ABSTRACT

A method is disclosed for operating a computer to gather input from respondents to electronic surveys and to evaluate preferences related to digital two dimensional and three dimensional images. The method includes providing a drawing tool for enabling survey respondent(s) to designate areas of interest on digital two dimensional and three dimensional images within an electronic survey. A graphical user interface enables the survey respondent(s) to utilize the drawing tool to create data files, which may include designated area data, attributes, and survey respondent opinions for designated area(s) of interest within an image. The data files are saved in a machine-readable file for analysis.

22 Claims, 7 Drawing Sheets

GRAPHICAL USER INTERFACE FOR GATHERING IMAGE EVALUATION INFORMATION

CROSS-REFERENCE TO RELATED APPLICATIONS

The following co-pending applications, U.S. application Ser. No. 11/717,855, filed Mar. 14, 2007, titled "Graphical User Interface for Presenting Image Evaluation Information", and U.S. application Ser. No. 11/724,008, filed Mar. 14, 2007, titled "Method and System for Image Evaluation Data Analysis", are assigned to the same assignee of the present application. The entire disclosures of these co-pending applications are totally incorporated herein by reference in their entireties.

BACKGROUND AND SUMMARY

This disclosure relates generally to computer software and systems, particularly business application software and systems, and more particularly graphical user interfaces for the data input for preferences and evaluation related to two-dimensional and three-dimensional images.

Product manufacturers operating globally utilize market research studies to obtain direct feedback about customer needs, values, and buying trends. For the purposes of such organizations, it is critical that these design considerations reflect the perspectives of all of a corporation's primary markets. Market research studies have taken several forms in an effort to identify product features that would be useful to and preferred by the widest customer population. For example, such studies have included focus groups, analysis of calls to customer service, interviews with industry experts, questionnaires/surveys, product testing, ethnographic techniques, among others. In one form, surveys containing images of proposed design concepts are presented to respondents in a hard copy format to solicit comments. Respondents comment on the various images by circling areas that they like or dislike as regarded such items as form factors or visual color changes and add written comments explaining their perspectives. This feedback is then collected, and the results are collated manually. Although much useful data may be gathered using this method, it presents several significant problems. The most serious include high analysis costs, difficulty in identifying meaningful patterns, limited survey distribution, and the extended amount of time necessary to complete the test itself.

Computer based survey tools have also been utilized to obtain customer data. Although computer surveys offered the benefits of electronic data collection and wider survey distribution, there was no means for respondents to physically draw and write on pages. Considering the visual and actual complexity of business products such as copiers, printers, and multi-function devices, useful design feedback and insights must necessarily be specific.

While these tools are useful, the product design process requires a high degree of specificity in obtaining actionable information relative to product appearance and architecture, and it is necessary that it include users world wide. The survey respondent needs the ability to identify specific areas of images and to provide comments relative to those areas. No existing survey applications permit respondents to draw on images to specify areas of interest and then comment on those areas. Nor are existing tools able to compile and analyze such data, in an accurate and easy comprehended manner.

To meet the needs of development of visually and operationally complex business products being marketed internationally, it would be desirable to have a market research tool that provides electronic distribution, worldwide participation, data security, ease of use, enabling of the positive or negative designation of any area of an image, enabling of association of specific comments to designated areas, quick, accurate, and cost effective analysis of the data, and visual presentation of the results in a clear, meaningful, and useful way.

All U.S. patents and published U.S. patent applications cited herein are fully incorporated by reference and are included only for purposes of adding alternative embodiments and are not intended to define or narrow the claim terms as set forth herein. The following patents or publications are noted.

U.S. Pat. No. 6,937,913 to Nishikawa et al. ("Product Design Process and Product Design Apparatus") describes a product design process and apparatus for defining an optimal product concept capable of conveying customer satisfaction. The process includes analysis of wants and needs information, and, based on the analysis, weighting is carried out with respect to evaluation indices which have been previously stored in a storage device. The wants and needs information includes quantitative measures of the degree to which the user is likely to perceive a benefit latent in the product under consideration and inherent in the wants and needs information. An evaluation index is selected from among a plurality of weighted evaluation indices and a product design concept for which the primary evaluation index selected is a maximum or minimum is defined.

U.S. Pat. No. 7,016,882 to Afeyan et al. ("Method and Apparatus for Evolutionary Design") describes generating and presenting, typically electronically, a number of design alternatives to persons who are participating in a design, selection, or market research exercise. The respondents transmit data indicative of their preferences among or between the presented design alternatives, and that data is used to derive a new generation of design alternatives or proposals. The new designs are generated through the use of a computer program exploiting a genetic or evolutionary computational technique. The process is repeated, typically for many iterations or cycles.

U.S. Published Patent Application No. 2005/0261953 to Malek et al. ("Determining Design Preferences of a Group") teaches a method for generating and presenting, typically electronically, generations of design alternatives to persons participating in the design, selection, or market research exercise. The respondents transmit data indicative of their preferences among or between the presented design alternatives. Some of the data is used to conduct a conjoint analysis or non-convergent exercise to investigate the drivers of the preferences of the group or its members, and at least a portion are used to derive follow-on generations of design alternatives or proposals. The follow-on designs are preferably generated through the use of an evolutionary or genetic computer program, influenced by the respondents' preferences. The process results in the generation of one or more preferred product forms and information permitting a better understanding of what attributes of the product influence the preferences of the test group members.

U.S. Published Patent Application No. 2005/0261953 to Goldstein ("Computer System and Method for Development and Marketing of Consumer Products") describes a computer-implemented method for the design and/or marketing of one or more consumer products based on an identified Icon includes capturing and storing in memory preferences of the Icon in accordance with at least one systematic survey of some of the preferences. One or more designs are created for a consumer product or for a space or scheme for a marketing promotion. The consumer product or space/scheme is stored in memory. The preferences may include aspects of a product or space and information regarding the background of the Icon.

The disclosed embodiments provide examples of improved solutions to the problems noted in the above Background discussion and the art cited therein. There is shown in these examples an improved method for operating a computer to gather input from respondents to electronic surveys and to evaluate preferences related to digital two dimensional and three dimensional images. The method includes providing a drawing tool for enabling survey respondent(s) to designate areas of interest on digital two dimensional and three dimensional images within an electronic survey. A graphical user interface enables the survey respondent(s) to utilize the drawing tool to create data files, which may include designated area data, attributes, and survey respondent opinions for designated area(s) of interest within an image. The data files are saved in a machine-readable file for analysis.

In an alternate embodiment there is disclosed a system for operating a computer to gather input from respondents to electronic surveys and to evaluate preferences related to digital two dimensional and three dimensional images. The system includes a drawing tool for enabling one or more survey respondents to designate areas of interest on digital two dimensional and three dimensional images within an electronic survey. A graphical user interface enables the survey respondents to utilize the drawing tool to create data files, which may include designated area data, attributes, and survey respondent opinions for one or more designated area of interest within an image. Means are also provided for saving the data files in a machine-readable file for analysis.

In yet another embodiment there is disclosed a computer-readable storage medium having computer readable program code embodied in the medium which, when the program code is executed by a computer, causes the computer to perform method steps for operating a computer to gather input from respondents to electronic surveys and to evaluate preferences related to digital two dimensional and three dimensional images. The method includes providing a drawing tool for enabling survey respondent(s) to designate areas of interest on digital two dimensional and three dimensional images within an electronic survey. A graphical user interface enables the survey respondent(s) to utilize the drawing tool to create data files, which may include designated area data, attributes, and survey respondent opinions for designated area(s) of interest within an image. The data files are saved in a machine-readable file for analysis.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
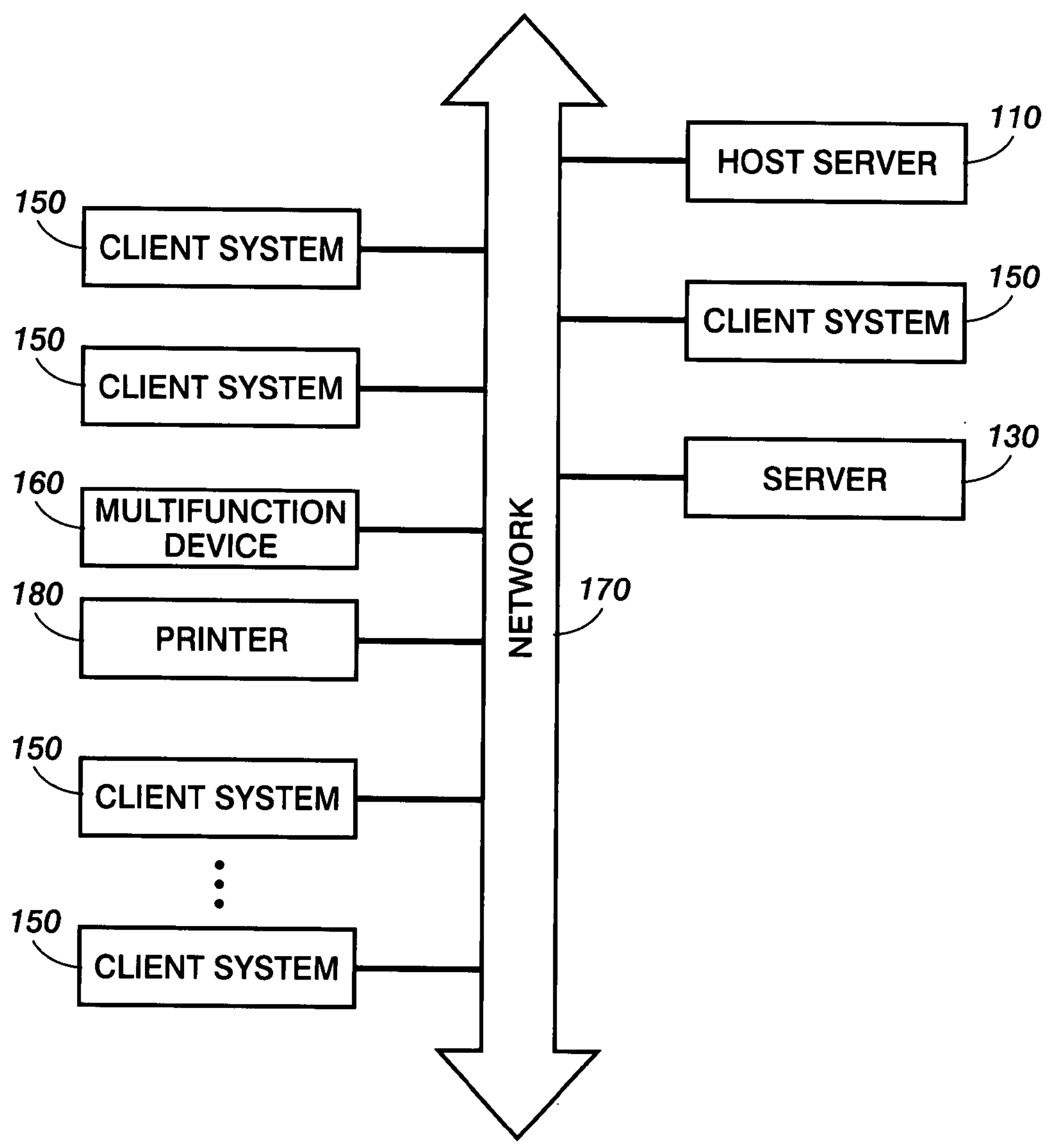
FIG. 1 is a block diagram of the operating environment for a system that provides computer operated product design evaluation.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The image evaluation system described herein presents proposed designs to survey respondents, and their feedback is collected via, for example, individual personal computers connected in a network such as an intranet, an extranet, or the internet. It is possible to control the interpersonal dynamics among the respondents. It is also possible to isolate them completely from one another, so that no one of them is aware of the preferences expressed by the other respondents. It is also possible to allow selective levels of information to be shared among the respondents, to initiate a real or virtual group discussion. Furthermore, by connecting respondents via a computer network, it is possible to assemble a group of respondents that are located in very different geographical locales. Time management is also facilitated, as the need to bring together all respondents at the same time is reduced by seamlessly integrating data that is received at different points in time.

For the purposes herein, "products" is intended to be a generic term referring to goods, such as objects intended to be mass produced, and modularized goods such as personal computers or printing devices, which comprise a plurality of interchangeable parts suitable for mass customization. "Attributes" of a product, as used herein, is intended to refer to the structural, functional, stylistic, or economic features of the product, and may include such things as cost, color or color combination, size, shape, style, pattern, length, weight, content feature, option, choice of material, etc. The product attributes may be aesthetic or functional. A given product has a series of possible attributes that are combined using the method of the disclosure herein to develop a design. Different types of objects of the design or selection may have different groups of possible attributes. Thus, for example, designs for an aesthetically pleasing exterior appearance of a printing device would have attributes such as material (e.g., plastic or metal), distribution of materials (e.g., plastic sides with metal features), texture, color, color combination, length, width, size of controls, shape of controls, location of controls, color of controls, position of status lights, etc. The term "attribute" denotes both elements that are absolute, in the sense that they are either present in the product or not, and relative, in the sense that an attribute can have many values, or be broken down into many subtypes. An example of the former is the presence or absence of a monitor on a printing device. An example of the latter is the location or size of controls on a printing device.

While for the purposes of explanation the method and system will be described as functioning within a network including various printing and communication devices, it will be appreciated by those skilled in the art that the system and method for product design evaluation may be beneficially utilized in any communication environment. All such variations and modifications are fully contemplated by the scope of the specification and claims herein.

Various computing environments may incorporate capabilities for supporting document communication capabilities utilizing facsimile controllers and equipment on which the facsimile controller may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Referring to FIG. 1, the block diagram illustrates an example embodiment of an image evaluation system in a networked environment. The network environment may contain client systems 150 through which users can access printers 180, multifunction device 160 and other devices connected to the network. The server 130 is a shared/private document repository. It also provides storage for the print server, containing, for example, historical printing information, logs, etc. for the printers controlled by the print server. Host server 110 hosts the modules of the product design evaluation system, including the input module, analysis module, and viewing module, which are discussed in more detail herein below with respect to FIG. 2.

All these main components are coupled together via network 170. The system and method herein are not limited to a particular type of network system 170 and may include a local-area network (LAN) such as an Ethernet network or a wide area network (WAN) such as the Internet or the World Wide Web. Client systems 150 can be connected to the network 170 through a variety of connections including standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, Net BIOS, Ethernet, RS232, and direct asynchronous connections). For example, the network 170 may be a corporate intranet connecting decision makers in an organization to a centralized decision engine, or it may be a secure extranet or virtual private network connecting different entities such as a company's suppliers or consultants to the company's design engine. Such networking environments are commonplace in offices, enterprise-wide computer networks, intranets and the Internet. Those skilled in the art will appreciate that the principles of the system and method described herein can be applied to virtually any network system without departing from the scope of the claims and specification.

The client systems 150 may be any personal computer, Windows-based terminal, network computer, wireless device, information appliance, X-device, workstation, minicomputer, mainframe computer, personal digital assistant, or other computing device and typically have a processor, random-access memory, read-only memory, and one or more storage devices, such as a hard drive, CD-ROM, DVD, diskette, etc. In the embodiments herein, client systems 150 may use any one of a number of windows-oriented operating systems. The processor is coupled to an output device, such as a display device, input devices, such as a keyboard, mouse, or pointer, and communication circuitry. The output device, for example, a monitor, displays information for viewing by a user of personal computer 150 and an input device is used to control a screen pointer provided by the graphical user interface of the operating system. The output device may comprise a computer, a television, or other electronic device coupled wirelessly or via wires to a server. The system and method herein are not limited to any particular output or input device.

Multifunction device 160 may be any device capable of scanning and transmitting image material, printing, copying, or transmitting facsimile images. Operation of multifunction device 160 is controlled from a user interface, which enables a user to select the function to be performed as well as enter information required by the device to perform an operation. Typically buttons or a keypad are utilized to enter information and select functionality, but a touch screen or any other means known in the art may be utilized. Multifunction device 160 communicates with print server 130 as well as host server 110 and client systems 150.

Figure 2:
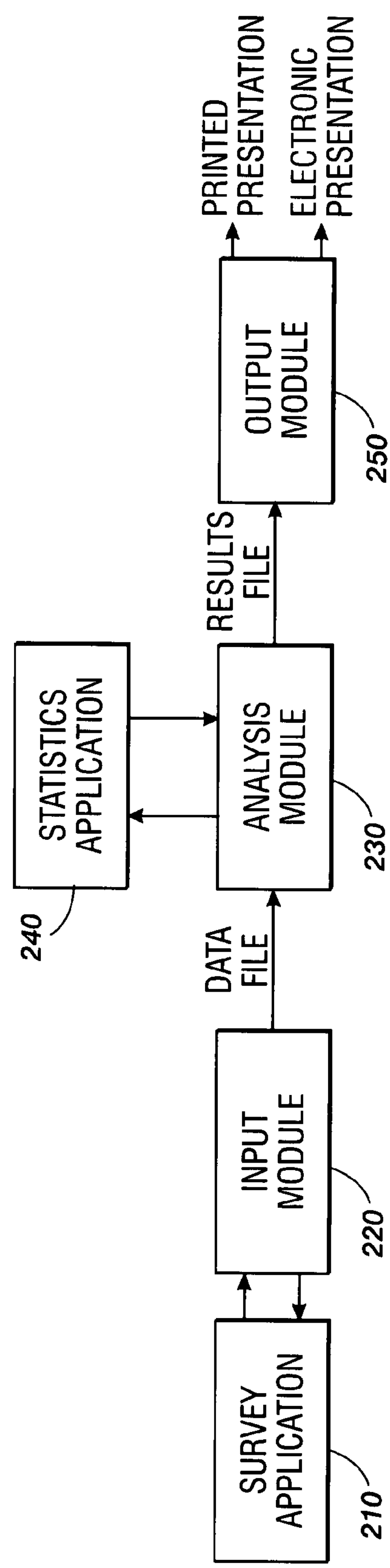
FIG. 2 is a block diagram of one embodiment of a system that provides computer operated product design evaluation.

Turning now to FIG. 2, one example embodiment of the system for image evaluation is described. The image evaluation system utilizes a set of uniquely designed software modules: an input module 220 to gather respondents' input, an analysis module 230 to process the resulting data from the input module, and an output module 250 for viewing the data. Input module 220 operates in conjunction with a commercially available electronic survey application 210 to permit survey respondents to provide input about selected areas of images. Any of various online survey tools could be utilized, including Vantage Point, Perseus, WebSurveyor, SurveyMonkey, iSalient, Key Survey, and Zoomerang, among others. In operation, the Input Module pulls variables that are set in the standard survey interface. These variables include, for example, instructional text, positive and negative area labels, the attributes presented for each area, the maximum number area designations allowed, and the image. These variables are used to populate the custom template.

After a survey respondent inputs data, the x and y and width and height coordinates, selected attributes and text comments for each area designation are returned to the survey tool and placed in a data file. Input module 220 enables respondents to use a custom drawing tool to designate areas of interest on digital images of three dimensional product concepts (or any image) that are presented in two-dimensional space within an electronic survey. The "designated area" data is comprised of the X and Y coordinates and width and height of the areas of images that respondents identify. Additionally, the input module 220 permits respondents to provide opinions (for example, ratings and/or comments) about the designated areas they identify. This information is saved in a machine-readable file for analysis.

Analysis module 230 receives the machine-readable file (Data File 1) from input module 220 and enables an automated analysis of the "designated area" data collected by the input module. Specifically, it utilizes multivariate exploratory techniques to analyze the coordinates of the "designated area" data and employs a unique scoring algorithm to identify the most significant areas of interest. It also enables "what if" scenarios to allow the data to be evaluated in multiple ways by changing parameter settings and links respondent comments and ratings to the significant areas of interest. This information is saved in a machine-readable file for analysis (Results File 1). Statistics application 240 communicates with analysis module 230 and performs cluster analysis of the data as specified by analysis module 230. For example, the analysis module passes a block of data plus the parameters set in the module to the respondent, who specifies the cluster assignments and heat mapping, and sends the cluster and heat mapping results back to the analysis module. For each image, the analysis module calculates positive and negative cluster scores, the number of positive and negative areas designated, the number of positive and negative comments, and the number of positive and negative attributes. For each cluster, the analysis module calculates a cluster score, the number of respondents, number of areas, number of areas with attributes, number of areas with comments, and the percentage of areas with each attribute checked. The analysis module compiles the data blocks, associates comments with clusters, converts the data to XML format, and writes the final output files.

Additional exploratory statistical methods may be added, such as multidimensional scaling, principal component analysis, factor analysis, correspondence analysis, and other multidimensional techniques. One embodiment of analysis module 230 is described more fully in U.S. application Ser. No. 11/724,008, filed Mar. 14, 2007, titled "Method and System for Image Evaluation Data Analysis".

Output module 250 enables an operator to easily view and understand the analysis of the data. It receives results files from analysis module 230 and transforms the computational results into a display that is superimposed over the original product images, thus providing an easily understood interpretation of the data. A top-level summary of the data is provided to enable the operator to compare respondent responses to all images that were evaluated. Additionally, it provides detailed results of each image that was evaluated, displaying the most important elements of the original images based on the original respondent selections along with associated comments and ratings. The data may be viewed, filtered by parameters like positive feedback, negative feedback, country, and type of respondent. Output module 250 also provides a variety of ways to select and adjust the appearance of the display of the data. The output may be viewed in the form of either a printed or electronic presentation. One embodiment of an output module is described in more detail in U.S. application Ser. No. 11/717,855, filed Mar. 14, 2007, titled "Graphical User Interface for Presenting Image Evaluation Information". While the product design evaluation system consists of three modules that are designed to work with each other, each module is a separate entity and may be used independently of the other modules for other applications.

The particular methods performed by the product design evaluation system comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 3:
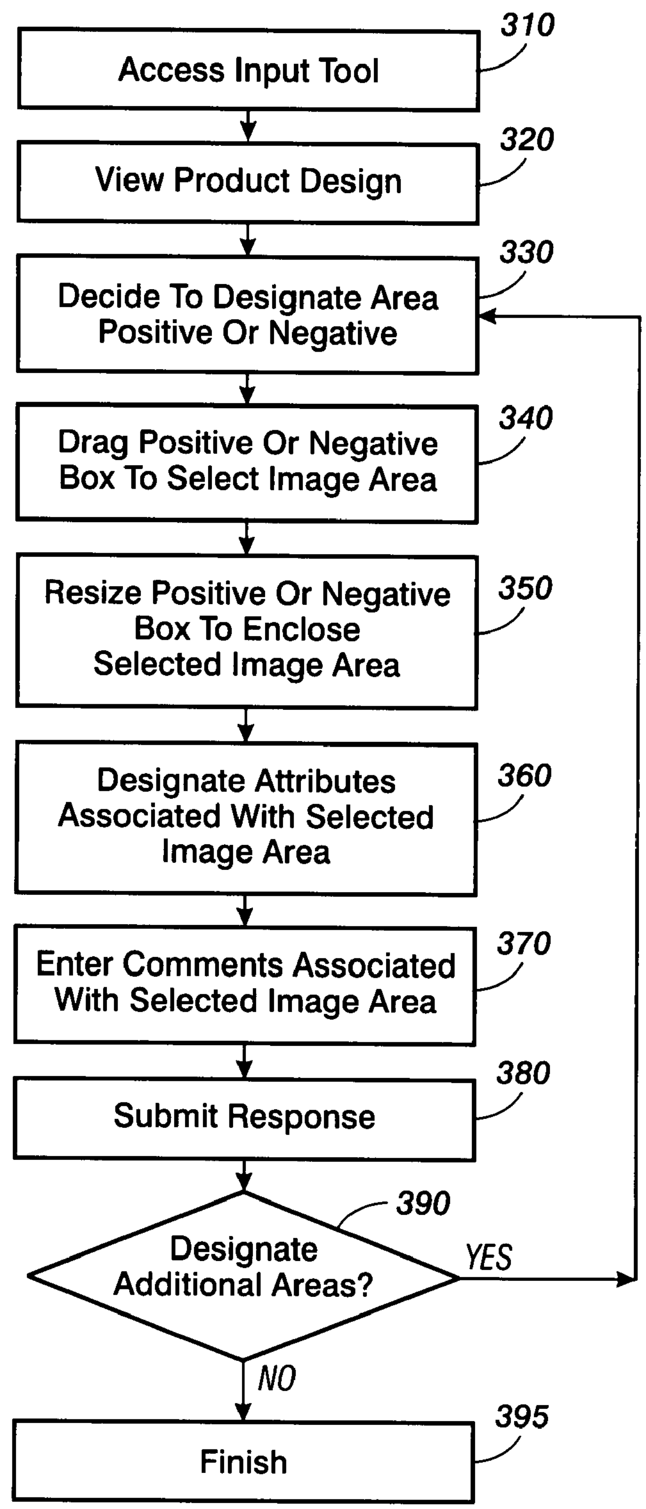
FIG. 3 is a flow diagram that illustrates an embodiment of the method of operation of the input module of the product design evaluation system.

Turning now to FIG. 3, there is shown operation of one example embodiment of the method for respondents to use a custom drawing tool with a graphical user interface to designate areas of interest within an electronic survey. The designated area data is comprised of the x and y coordinates and width and height of the areas of images that respondents identify. Additionally, the input application permits respondents to provide opinions (in the form of ratings and/or comments) about the designated areas they identify. This information is then saved in a machine-readable file for analysis. At 310 the data input tool, including the custom drawing tool, is accessed through a survey application, which may be any survey application known in the art, including such commercially available survey tools as VantagePoint, Perseus, WebSurveyor, Survey-Monkey, iSalient, Key Survey, and Zoomerang.

The input module presents the survey respondent with a view of the product design(s) to be reviewed on the graphical user interface at 320. Upon viewing the subject design(s) the respondent decides at 330 whether to designate a particular feature or area of the product design(s) as being viewed positively or negatively or grouped categorically. To indicate this designation, the respondent is presented with any categorical groupings or representations known in the art on the graphical user interface, for example, positive or negative selectors. The positive and negative selectors may be in the form of boxes, which may be distinguished from each other by different colors and/or labels. While for the purposes of this discussion boxes are utilized for positive or negative selection, it will be appreciated to those skilled in the art that many other forms may be utilized, with or without color coding, shading, or pattern. All such variations are fully contemplated by the scope of the specification and claims herein. The respondent selects either a positive or negative box and drags it to the feature or area of interest at 340. The respondent may resize the positive or negative box as needed to enclose the selected image area at 350.

After an area is designated, the graphical user interface displays a data entry box which permits the respondent to indicate attributes associated with the selected image area at 360. The attributes may be displayed in the form of a list of selectable attributes or other form known in the art, all of which are contemplated by the specification and scope of the claims herein. The data entry box also includes an area in which the respondent may enter comments associated with the selected image area at 370. When a respondent has completed entering comments for the selected image area, the response is submitted at 380. The respondent then determines whether to designate additional features or areas at 390. If additional features or areas are to be designated, the product design(s) are again presented to the respondent for designation of features or areas and the process is repeated until the respondent has no further designations or comments. When the review process is completed, the respondent indicates completion at 395 and the data, including the x and y coordinates and width and height of the areas/features selected, attributes, and comments, is saved in a machine-readable file for analysis.

Figure 4:
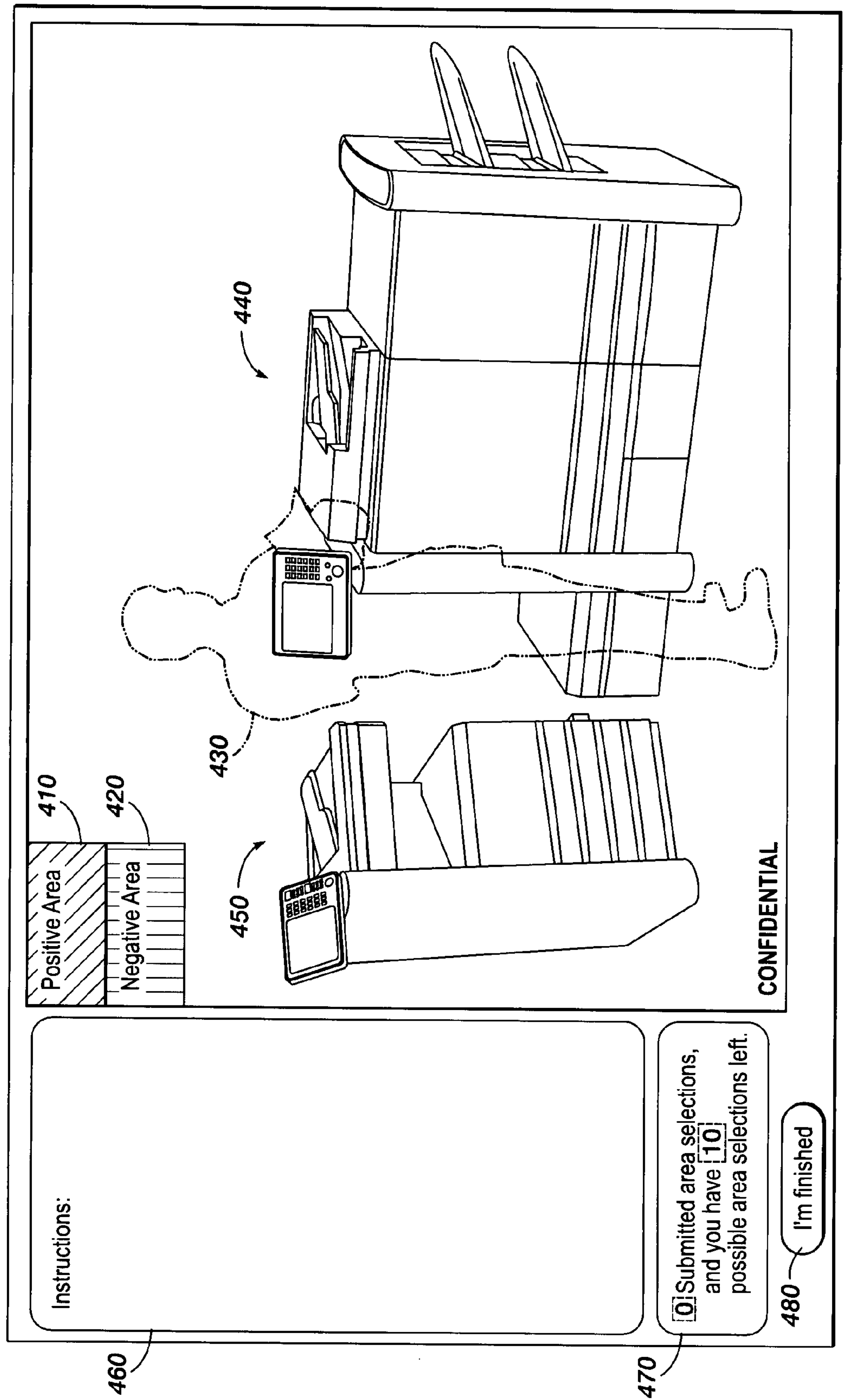
FIG. 4 is an example embodiment of a dynamic graphic display of the input module presented within a survey application.

Turning now to FIG. 4, there is illustrated one example embodiment of the graphical user interface of the input module presented within a survey application. In this view, two possible product designs 440 and 450 are presented to the respondent. While for the purposes of this embodiment two product designs are illustrated, it is noted that a single design or multiple designs could be presented for review. An outline of a human figure 430 may optionally be provided as a means of assessing equipment scale. Color coded boxes 410 and 420 are provided to enable the respondent to make positive and negative feature or area designations. For the purposes of this embodiment, a green color coded box 410 is used for positive area designation and red color coded box 420 is used for negative area designation. It is noted that other approaches to positive and negative area selection may be utilized, such as textures, patterning, labels, or other means known in the art. The respondent may select designated areas by performing a drag operation on either the positive box 410 or negative box 420 with a mouse, stylus, or other means known in the art. Instructions for use of the input module components may be provided on the user interface, as shown with item 460. For those cases in which the respondent is limited to a specific number of area selections, a response tabulation area 470 may be provided. The user interface also provides a finish button 480 to indicate that all selections have been completed.

Figure 5:
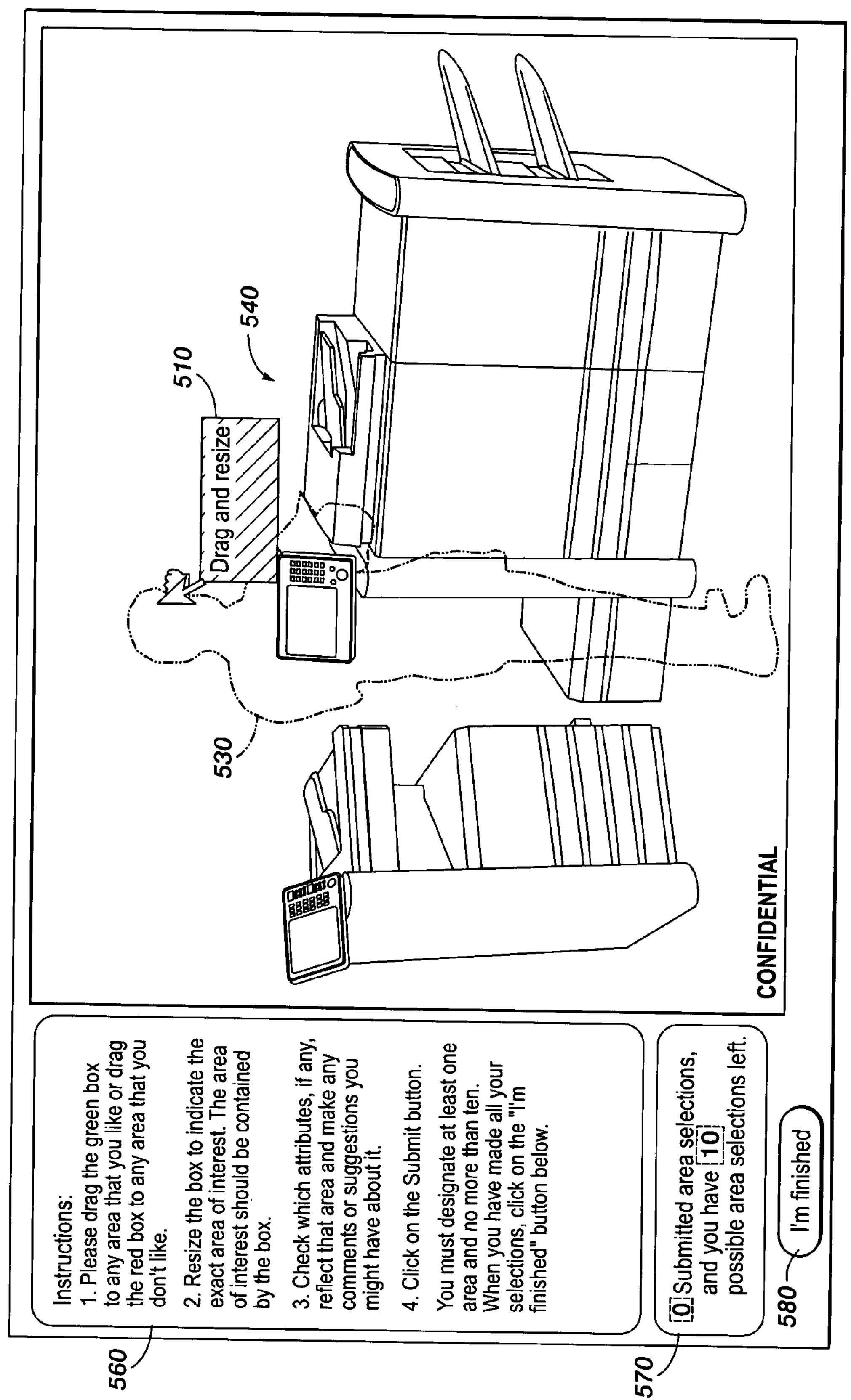
FIG. 5 is an example embodiment of a dynamic graphic display for the feature selection capability of the input module.

Turning now to FIG. 5, an example embodiment of the graphical user interface after a positive area box has been selected and dragged to the approximate area of a feature of the product design is illustrated. In this view, positive box 510 has been dragged to a location proximate to design 540. The user interface may optionally display the outline of a human FIG. 530 for the purposes of determination of scale. Instructions for use of the interface may be provided as shown at 560; a response tabulation area 570 may also be provided. Finish button 580 is utilized when all area designations have been completed.

Figure 6:
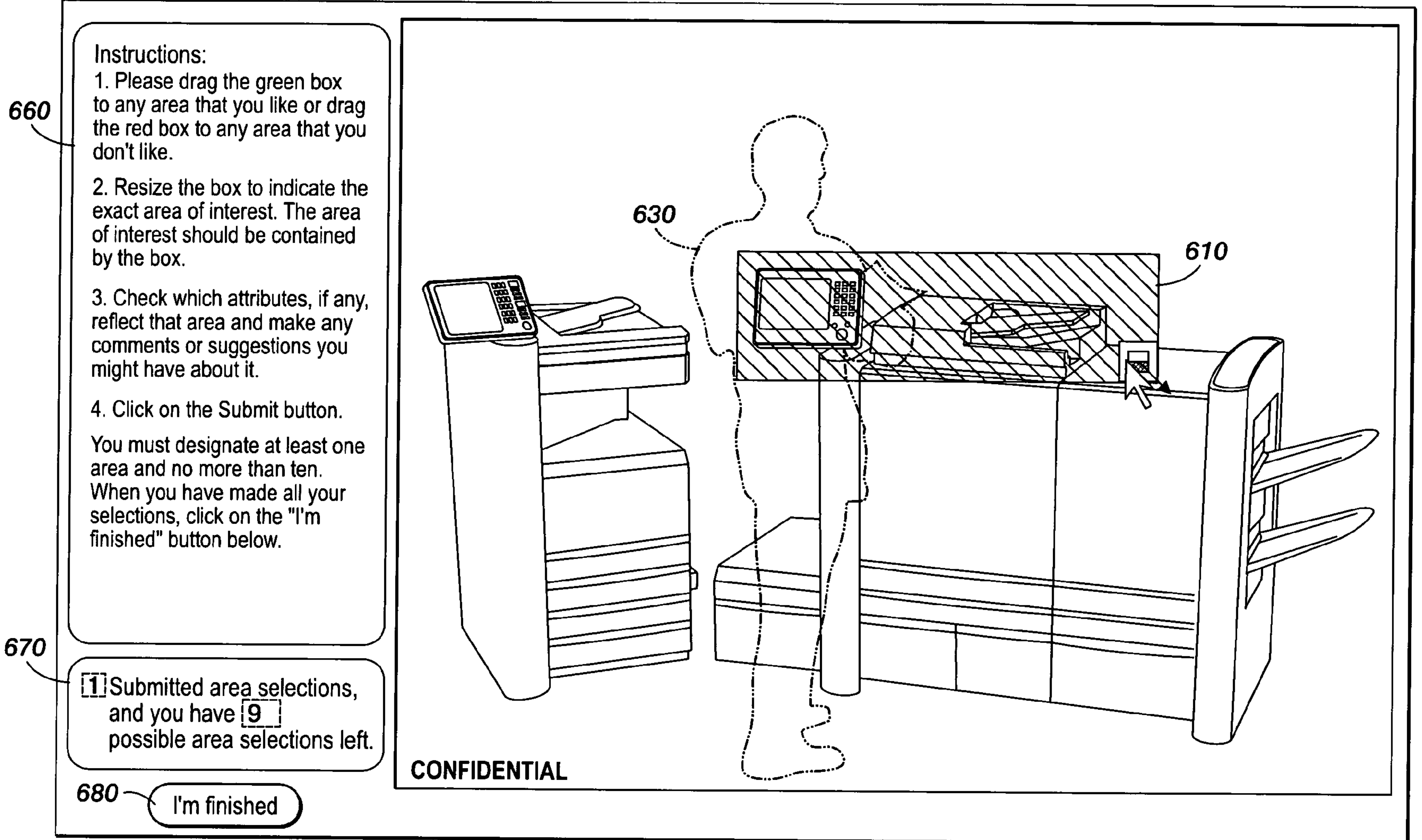
FIG. 6 is an example embodiment of a dynamic graphic display for area selection capability of the input module.

Referring to FIG. 6, an example embodiment of the graphical user interface after a positive selection box has been resized is illustrated. In this view, positive selection box 610 has been resized to capture the top features of sample product design 640. An optional outline of a human figure 630 is shown for the purposes of scale. Instructions for use of the interface may be provided at 660; a response tabulation area 670 may also be provided. Finish button 680 is utilized when all area designations have been completed.

Figure 7:
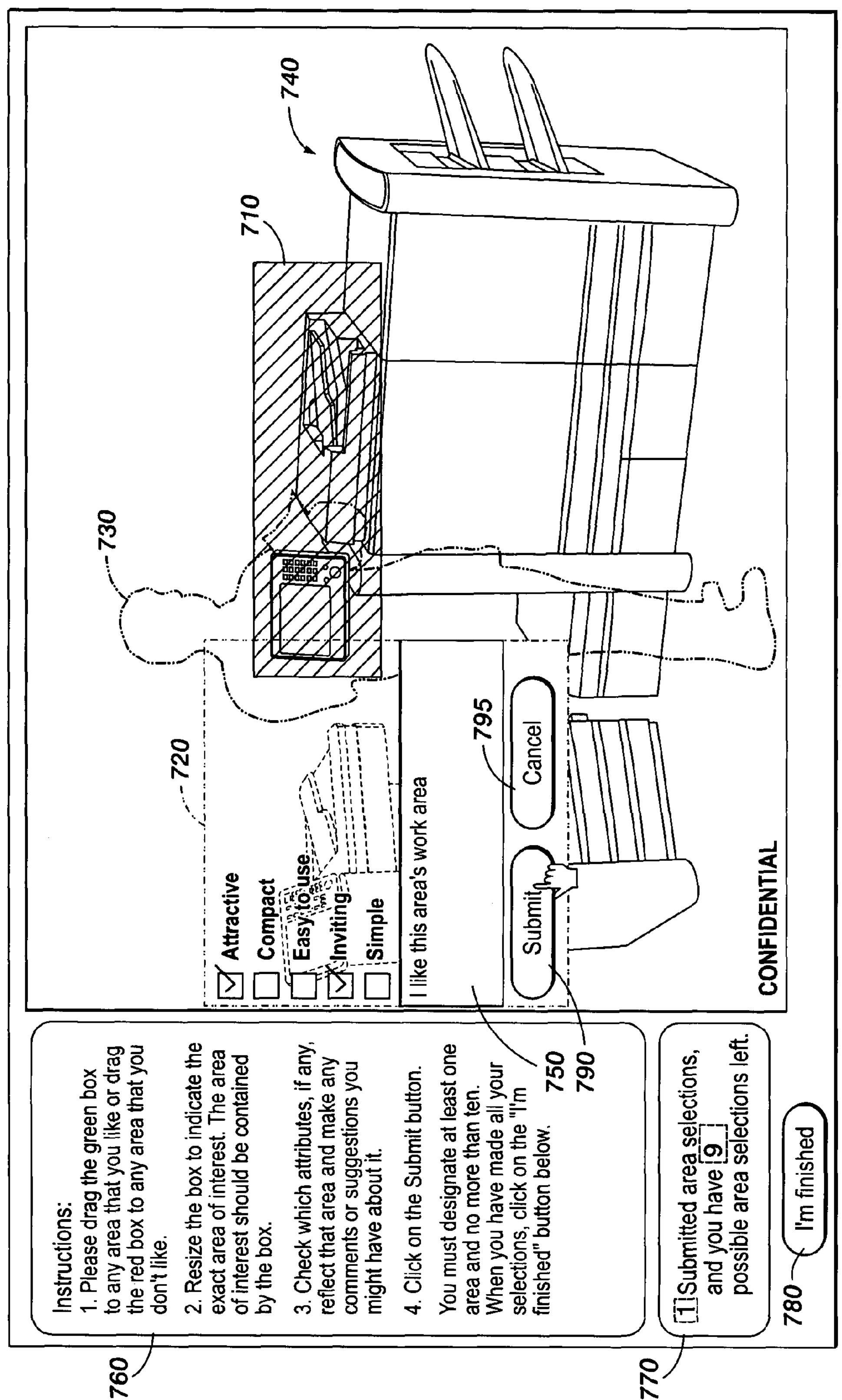
FIG. 7 is an example embodiment of a dynamic graphic display for data entry and comments from a survey respondent.

Referring now to figure 7, an example embodiment of the user interface displaying an example embodiment of a data entry box is illustrated. In this view positive designation box has been resized to capture the x and y coordinates and width and height of the top portion of product design 740. The outline of a human figure 730 may optionally be provided for purposes of scale. Data entry box 720 provides a list of attributes selectable by the survey respondent. For the purposes of this embodiment, the attributes include “attractive”, “compact”, “easy to use”, “inviting”, and “simple”. However, it will be appreciated that numerous alternate attributes could be listed depending on the product design or object being presented to the respondent and the information desired, all of which are contemplated by the scope of the specification and claims herein. Comment area 750 may also be provided, to enable the respondent to enter specific comments relating to the area designated.

Depressing submit button 790 saves the information relating to the attributes, comments, designated area x and y coordinates and width and height, and gives the respondent the opportunity to select another designated area in the displayed product designs. Depressing the cancel button 795 cancels the information relating to the designated area and returns the respondent to the area selection function. Instructions for use of the interface 760 may be provided, as well as a selection tabulation area 770. When the respondent has completed making selections, the finish button 780 is depressed and the information on the selections is saved to a machine-readable file for analysis.

For the purposes of discussion, the above description is directed to product design evaluation for printing devices. However, the method, system, and user interface could be beneficially applied to any application utilizing either two dimensional or three dimensional images. One such example, among many, is analysis of medical imaging. In this case, if a chest X-ray is being considered, the categories may be heart or lung rather than positive or negative. The attributes could be simplified to benign or malignant. Alternate examples include quality assurance or visual defect investigation. In this case, there may be just one category for area selection: defect. And the attribute options after the defect area is designated could be all possible departments or assembly line areas that could have produced or been responsible for the defect.

While the present discussion has been illustrated and described with reference to specific embodiments, further modification and improvements will occur to those skilled in the art. For example, free form area designation rather than a rectilinear shape would allow more specific, pin pointed area designation, especially when images are shown at severe angles. Alternatively, the attributes list, which currently allows a respondent to select as many as they want, could be changed to allow only one selection. This would facilitate yes/no, rating scale or ranking responses in that area. Additionally, “code” as used herein, or “program” as used herein, is any plurality of binary values or any executable, interpreted or compiled code which can be used by a computer or execution device to perform a task. This code or program can be written in any one of several known computer languages. A “computer”, as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that numerous variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for operating to gather input from respondents to electronic surveys to evaluate preferences related to one or more products depicted in digital two dimensional and three dimensional images, the method comprising:

providing a drawing tool for enabling at least one survey respondent to designate areas of interest related to said one or more products depicted in at least one of said digital two dimensional and three dimensional images within an electronic survey, wherein said designated areas of interest comprise a positive or negative indication;

providing a graphical user interface (GUI) to permit said at least one survey respondent to utilize said drawing tool to create data files, wherein said data files comprise at least one member selected from the group comprising designated area data, positive or negative attributes, and survey respondent opinions for at least one designated area of interest within an image;

presenting, to said at least one survey respondent via said GUI, said positive attributes when said at least one designated area of interest comprises a positive indication;

presenting, to said at least one survey respondent via said GUI, said negative attributes when said at least one designated area of interest comprises a negative indication, wherein said positive and negative attributes relate to features associated with at least one designated area of interest and are selectable by said at least one survey respondent; and saving, in storage, said data files in a machine-readable file for analysis.

2. The method according to claim 1, wherein said designated area data comprises the location and size of said at least one designated area of interest.

3. The method according to claim 1, wherein said GUI presents at least one two dimensional or three dimensional image for review by said at least one survey respondent.

4. The method according to claim 1, wherein said GUI comprises means for assessing a scale of said at least one of said digital two dimensional and three dimensional images.

5. The method according to claim 1, wherein said at least one designated area of interest is identified by enclosing said at least one designated area of interest in a rectilinear shape or free-form area designator.

6. The method according to claim 5, wherein said rectilinear shape or said free-form area designator is characterized by coding to display said positive or negative indication.

7. The method according to claim 6, wherein said coding comprises at least one member of the group comprising color, pattern, and shading.

8. The method according to claim 1, wherein said GUI provides instructions for use of said GUI.

9. The method according to claim 1, wherein said GUI provides response tabulation capability.

10. The method according to claim 1, wherein said GUI provides at least one data entry box from which said positive and negative attributes are selected.

11. The method according to claim 10, wherein said positive and negative attributes are dependent on at least one member selected from the group comprising product design, object being present, and type of information desired.

12. The method according to claim 1, wherein said GUI provides a comment area for enabling entry of comments or opinions associated with said at least one designated area of interest.

13. The method according to claim 1, wherein a plurality of digital two dimensional and three dimensional images are included within said electronic survey.

14. The method according to claim 13, wherein said data files are split into separate data files corresponding to each image within said plurality of digital two dimensional and three dimensional images.

15. A system for operating a computer to gather input from respondents to electronic surveys to evaluate preferences related to one or more products depicted in digital two dimensional and three dimensional images, the system comprising:

a drawing tool for enabling at least one survey respondent to designate areas of interest related to said one or more products depicted in at least one digital two dimensional and three dimensional images within an electronic survey, wherein said designated areas of interest comprise a positive or negative indication;

a (GUI) to permit said at least one survey respondent to utilize said drawing tool to create data files, wherein said data files comprise at least one member selected from the group comprising designated area data, positive or negative attributes, and survey respondent opinions for at least one designated area of interest within an image, wherein said GUI presents said positive attributes to said at least one survey respondent when said at least one designated area of interest comprises a positive indication, and wherein said GUI presents said negative attributes to said at least one survey respondent when said at least one designated area of interest comprises a negative indication, and wherein said positive and negative attributes relate to features associated with at least one designated area of interest and are selectable by said at least one survey respondent; and storage for saving said data files in a machine-readable file for analysis.

16. The system according to claim 15, wherein said GUI provides at least one data entry box from which said positive and negative attributes are selected.

17. The system according to claim 16, wherein said positive and negative attributes are dependent on at least one member selected from the group comprising product design, object being present, and type of information desired.

18. The system according to claim 15, wherein said GUI provides a comment area for enabling entry of comments or opinions associated with said at least one designated area of interest.

19. The system according to claim 15, wherein said at least one designated area of interest is identified by enclosing said at least one designated area of interest in a rectilinear shape or free-form area designator.

20. The system according to claim 19, wherein said rectilinear shape or said free-form area designator is characterized by coding to a display said positive or negative indication.

21. The system according to claim 15, wherein said designated area data comprises a location and size of said at least one designated area of interest.

22. A computer-readable storage medium having computer readable program code embodied in said medium which, when said program code is executed by a computer causes said computer to perform method steps for operating a computer to gather input from respondents to electronic surveys to evaluate preferences related to one or more products depicted in digital two dimensional and three dimensional images, the method comprising:

providing a drawing tool for enabling at least one survey respondent to designate areas of interest related to said one or more products depicted in at least one digital two dimensional and three dimensional images within an electronic survey, wherein said designated areas of interest comprise a positive or negative indication;

providing a graphical user interface (GUI) to permit said at least one survey respondent to utilize said drawing tool to create data files, wherein said data files include at least one member selected from the group comprising designated area data, positive or negative attributes, and survey respondent opinions for at least one designated area of interest within an image;

presenting, to said at least one survey respondent via said GUI, positive attributes when said at least one designated area of interest comprises a positive indication;

presenting, to said at least one survey respondent via said GUI, negative attributes when said at least one designated area of interest comprises a negative indication, wherein said positive and negative attributes relate to features associated with at least one designated area of interest and are selectable by said at least one survey respondent; and saving said data files in a machine-readable file for analysis.

* * * * *